United States Patent [19]
Schuessler

[11] Patent Number: 5,959,285
[45] Date of Patent: Sep. 28, 1999

[54] TWO-DIMENSIONAL BAR CODE SYMBOLOGY USING GRAY CODE ENCODATION SCHEME

[75] Inventor: Frederick Schuessler, Mt. Sinai, N.Y.

[73] Assignee: Symbol Technologies, Inc., Holtsville, N.Y.

[21] Appl. No.: 08/734,438

[22] Filed: Oct. 16, 1996

[51] Int. Cl.$^6$ ........................................... G06K 7/10
[52] U.S. Cl. ............................. 235/462.04; 235/494
[58] Field of Search ................................. 235/494, 462, 235/472, 454, 456, 466, 462.01, 462.04

[56] References Cited

U.S. PATENT DOCUMENTS

| | | | |
|---|---|---|---|
| 4,114,033 | 9/1978 | Okamoto et al. | 235/494 |
| 4,387,297 | 6/1983 | Swartz et al. | 235/462 |
| 4,409,470 | 10/1983 | Shepard et al. | 235/472 |
| 4,760,248 | 7/1988 | Swartz et al. | 235/472 |
| 4,794,239 | 12/1988 | Allias | 235/462 |
| 5,138,140 | 8/1992 | Siemiatowski et al. | 235/462 |
| 5,235,172 | 8/1993 | Oehlmann | 235/494 |
| 5,304,786 | 4/1994 | Pavlidis et al. | 235/462 |
| 5,504,322 | 4/1996 | Pavlidis et al. | 235/494 |
| 5,818,026 | 10/1998 | Melling et al. | 235/494 X |

OTHER PUBLICATIONS

"PDF417 Specification" as submitted to AIM's Technical Symbology Committee for review, Symbol Technologies, 1991.

Primary Examiner—Donald Hajec
Assistant Examiner—Karl Frech

[57] ABSTRACT

A electro-optical memory includes a substrate on which is printed (or otherwise inscribed) a complex symbol or "label" or "bar code" with a high density two-dimensional symbology utilizing gray coding scheme for at least part of its content. The bar code contains component symbols or "codewords" placed in row and column formation, a variable number of codewords per row, and a variable number of rows. Codewords indicating spacial arrangement are encoded using gray code, and codewords representing actual information are encoded using any two-dimensional code having at least three subsets of codewords, with each subset containing a full information character set. The memory may be used in conjunction with a scanner and a suitable control system in a number of applications, e.g., robotics operations or automated object searching.

22 Claims, 5 Drawing Sheets

TWO-DIMENSIONAL BAR CODE SYMBOLOGY USING GRAY CODE ENCODATION SCHEME

U.S. Pat. No. 5,304,786 is incorporated by reference herein.

BACKGROUND OF THE INVENTION

The present invention relates to a two dimentional bar code symbol consisting of a variable number of component symbols or "codewords" with some codewords encoded using gray coding technique.

Bar Code Symbology

Bar codes are well known in the art. Today, bar codes are used in just about every type of business application: point-of-sale, retail, warehousing, etc. Bar codes are printed on individual items and on containers enclosing a number of items. Bar codes carry information encoded into bars and spaces of various width, arranged in a predetermined patterns. The bars and spaces are made up of unit elements called mocdules. A module has a specified height and width. Width is usually called the horizontal dimension of the module. The module is usually crossed by the scanning beam along its horizintal dimension. The relative size of a bar coded label is determined by the type of coding used, as are the actual sizes of bars and spaces. The size of the bar code is also directly proportional to the amount of information which is stored in that bar code. Conversely, the amount of information is constrained by the size limitations on the bar code. Bar codes usually get scanned via a bar code scanning system, and the encoded information gets extracted and decoded by the system's processing means. Bar code reading can be accomplished by scanning across the bar code with a laser scanner, or with a charged coupled device(CCD.) Bar code reading systems are known in the art and have been disclosed, for example, in U.S. Pat. Nos. 4,251,798; 4,360,798; 4,369,361; 4,387,297; 4,409,470 and 4,460,120.

A number of different one-dimensional bar code symbologies (encodation schemes) exist. These symbologies include UPC/EAN, Code 39, Code 128, Codabar and Interleave 2of 5. Due to the low information density storage capacity these types of bar codes can carry only a limited amount of information, on the order of ten to twenty letters or digits. This information is usually an index to a file or a data base where more comprehensive information is stored.

Symbologies of (n,k) Type

Some bar codes are referred to as belonging to the (n,k) family. A code of (n,k) type uniquely represents characters by a string of n modules containing k bars and k spaces. The UPC symbology is an example of a (7,2) code, i.e., n=7 and k=2.

Two-dimensional bar codes carry more information per substrate area than linear bar codes. Some two-dimensional bar code symbologies are just an extension of one-dimensional bar codes, in that the are formed by stacking rows of one-dimensional bar codes and placing a horizontal line between each row. In order to keep the same vertical dimension of the overall bar code, the height of each row is smaller then the normal height of a one-dimensional bar code. U.S. Pat. No. 4,794,239.

PDF417 symbology is another type of two dimensional bar code symbology that is used when we need to encode a greater amount of information within a limited amount of space, thus giving us higher information density encodation scheme. U.S. Pat. No. 5,304,786. A "stacked" two-dimensional bar code, such as PDF417, uses a row/column spacial arrangement of codewords. The information is usually broken up and encoded into individual "codewords" which, when decoded, are used to recompose the encoded information. When a bar code is scanned by a laser scanner or a CCD scanner, the scanner's bar code processing means must be able to determine of the relative position of each scanned codeword. Not only must it be able to properly decode the information contained in the codeword, it must also determine where the codeword fits in relation to other codewords within its row and with respect to other rows of codewords.

A limiting factor in optimizing the density of "stacked" two-dimentiosional bar codes is the signal cross-talk between the adjacent rows of bars and spaces, caused by the scanning spot illuminating two adjacent rows. The adjacent row indicator codewords of the PDF417 code may contain completely different bar space patterns, thus making it difficult to determined which row of the bar code has been scanned. If the beam, for example falls ½ within one row and ½ within another row, the row cross-talk may produce an undecodable signal, or even worse, produce a decoding error. Having smaller ratio between the vertical dimensions of the scanning spot and the module height lowers the probability of the scanning spot crossing two row of bars and spaces at the same time.

In order to optically resolve the bars and spaces of a bar code, while scanning along the row of modules, the horizontal dimension of a scanning spot of a bar code scanner is dictated by the horizontal module size of the scanned bar code. The horizontal spot size in turn places a restriction upon the smallest vertical dimensions of the scanning spot. Therefore, further reduction of the vertical dimension of the scanning spot in order to reduce the interrow cross-talk is not always possible. Even when reduction of the vertical size of the scanning spot is possible, it is not always advantageous. Having a taller spot helps to integrate the printing noise due to a greater spot coverage area.

The other alternative is to increase the vertical dimension of the module. This, in turn places a lower limit on the vertical dimension of any single row of bars and spaces, and dictates the vertical dimension of the overall label. PDF417 specification, for example, dictates that the smallest vertical to horizontal ratio of any module is three.

Matrix codes provide high information density storage capacity, but are also succeptible to interrow cross-talk problem. In addition, matrix codes are not decodable by a laser-scanner and therefore may not be used in many laser scanning applications.

Having a bar code encodation scheme which allows greater reduction of the vertical to horizontal size ratio of a module, without a corresponding increase in interrow cross-talk, is needed improve the bar code's information density storage capacity. This, in turn, will open up new bar code applications where traditional two-dimensional bar codes could not be used due to their limiting real estate requirements.

SUMMARY OF THE INVENTION

A two-dimensional label in accordance with the invention comprises multiple rows of bars and spaces ("stacked" bar code). The smallest element of any bar or space is a module. The bars and spaces are combined into a predetermined patterns. Each row of bars and spaces contains spacial order indicator patterns, information patterns and a stop pattern. The stop pattern could be any designated bar and space pattern. In order to minimize the size of the stop pattern a single module bar could be used. In the case of a "stacked" bar code, the spacial order indicators are called row indicators.

The row indicators according to the invention are encoded using gray code. Gray code minimizes the difference between the adjacent patterns, ideally by one module. Various types of gray codes could be used, including an (n,k) gray code, where n is the number of modules, k is the number of bars and is also the number of spaces in a pattern.

The information patterns are called codewords. They contain actual encoded information. The information is encoded using any two-dimensional code. PDF417 is used to encode the information in the preferred embodiment of the invention.

Using gray code to encode row indicators reduces the interrow cross-talk noise, when the scanning spot illuminates modules from two adjacent rows at the same time. Using gray code for row encoding in combination with PDF417 for information codeword encoding allows one to increase the information storage density of the bar code, as compared to regular PDF417 bar code.

The object of the invention is to increase the information density of a bar coded label.

Another object of the invention is to reduce sensitivity to cross-talk between the adjacent rows of a stacked bar code label.

Another object of the invention is to reduce sensitivity to cross-talk between the adjacent rows of a matrix bar code label.

Another object of the invention is to encode at least a part of a bar code using a gray code.

Another object of the invention is to encode at least a part of a bar code using an (n,k)gray code.

Another object of the invention is to combine gray code encodation scheme with another two-dimensional bar code encodation method.

Another object of the invention is to combine gray code encodation scheme with PDF417 bar code encodation method.

Another object of the invention is to combine (8,2)gray code encodation scheme with PDF417 bar code encodation method.

Another object of the invention is to devise a system for printing labels which combine gray code encodation scheme with another two-dimensional bar code encodation method.

Another object of the invention is to devise a bar code reader for reading labels that combine gray code encodation scheme with another two-dimensional bar code encodation method.

Another object of the invention is to devise a bar code reader for reading labels, that combine gray code encodation scheme with another two-dimensional bar code encodation method, using various scanning patterns.

Another object of the invention is to devise decoding method for decoding labels that combine gray code encodation scheme with another two-dimensional bar code encodation method.

Another object of the invention is to devise a system for performing functions based upon the information encoded by combining gray code encodation scheme with another two-dimensional bar code encodation method.

In keeping with these objects of the invention and others which will become apparent hereinafter, the invention comprises a new symbology that combines the advantages of each of its components. The result is a new symbology capable of encoding large amounts of data into a relatively small real estate without sacrificing encodation security or increasing the probability of error.

A new decode algorithm is also invented that takes advantage of the special features of the new symbology.

A printing device and a scanning device associated with the new symbology are described accordingly.

A system for utilization of the advantages provided by the new bar code symbology is presented.

DETAILED DESCRIPTION OF THE PREFERRED EMBODIMENT

Figure 1:
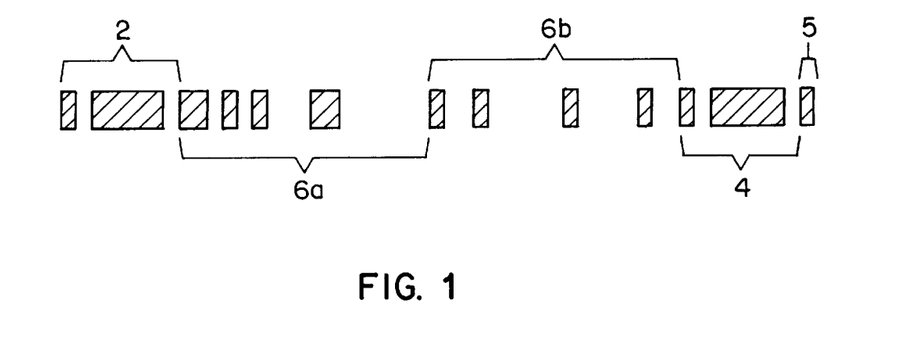
FIG. 1 is an illustration of an individual row of the label of the present invention.
Figure 6:
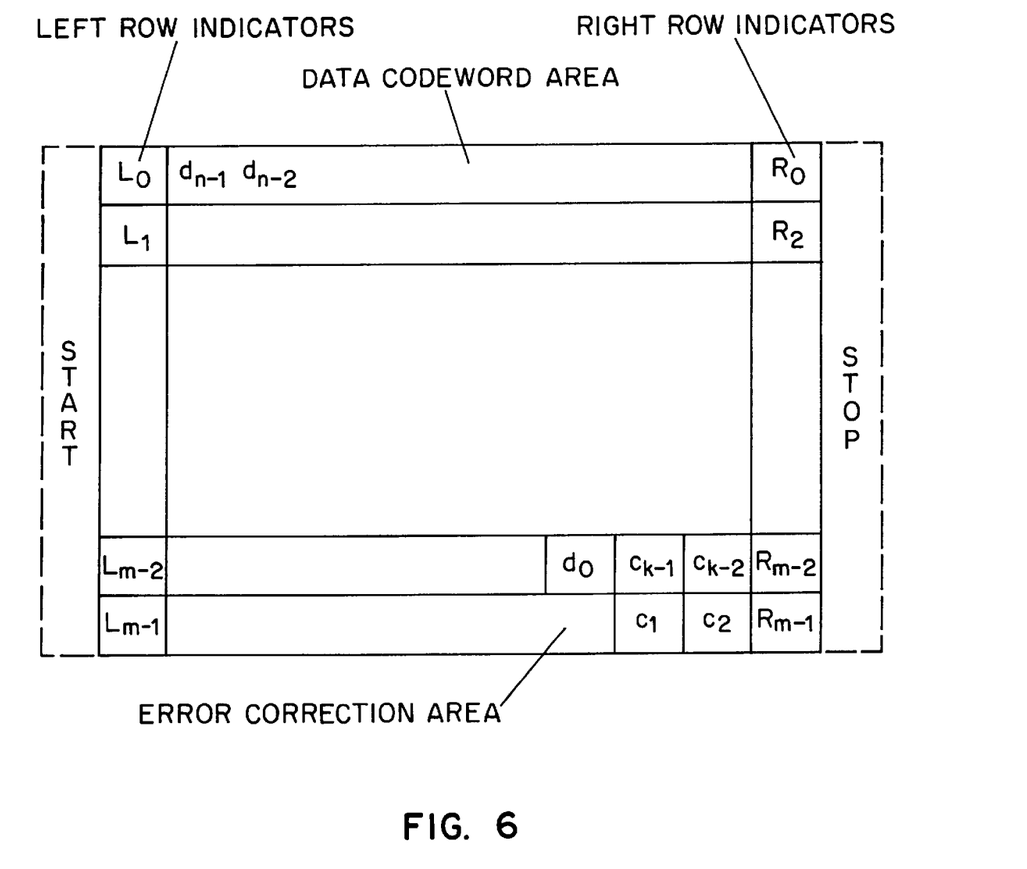
FIG. 6 illustrates the format of the PDF417 bar code.

FIG. 1 illustrates the structure of a single row of the label according to the preferred embodiment of the invention. As can be seen from the figure, each row consists of a left row indicator 2, a string of two information carrying codewords designated by reference numeral 6a and 6b respectively, a right row indicator 4 and a single module 5 representing a stop module. Both left and right row indicators are encoded using (8,2) gray code encoding method and contain the same row information. The string of information carrying codewords of the invention is encoded using a PDF417 encoding method. PDF417 symbology is described in July 1994 AIM USA Uniform Symbology Specification. FIG. 6 illustrates the format of the PDF417 bar code, showing the data codewords, as well as the error correction codewords, placed in a row/column matrix orientation. All the codewords are located in between the left and right row indicators. As described in the AIM USA specification, all the codewords are divided into three clusters of bar-space patterns, or (n,k) patterns with n=17 and k=4, with each cluster being able to encode a full information character set. Each row contains codewords belonging to one of the three sequentially alternating codeword clusters. Also, there is a correspondence between the row number and the cluster number of the codewords used in a particular row.

The preferred embodiment of the present invention does not use PDF417 start character and replaces the stop character by a single bar module. Reducing the row indicator's length to eight modules, eliminating the start character and reducing the stop character to a single module, minimizes the row information overhead and improves the information density storage capacity in the horizontal dimension.

Figure 1A:
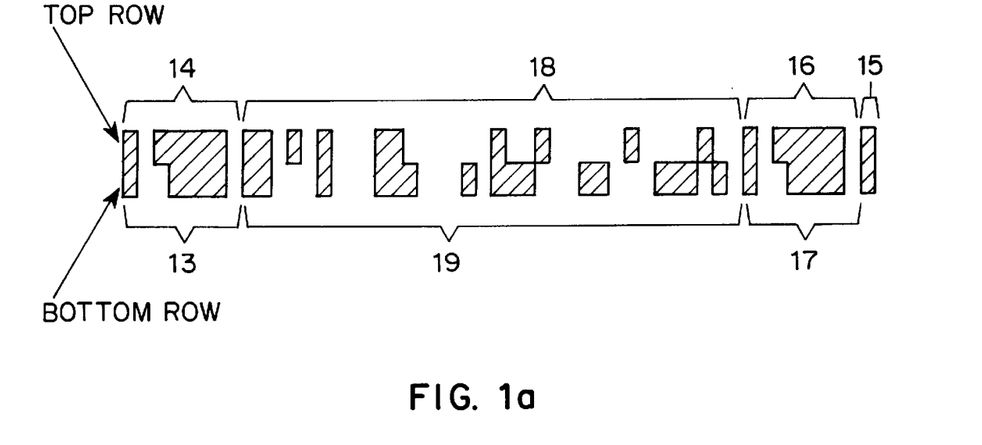
FIG. 1a is an illustration of two rows of the label of the present invention.

FIG. 1a illustrates two rows of the label encoded according to the present invention. As can be seen from the figure, the left top row indicator 14, differs from the left bottom row indicator 13 by a single module. The same holds true for the top and bottom right row indicators, reference numerals 16 and 17 respectively. The codewords located in the top row 18, belong to a different codeword cluster than the codewords in the bottom row 19. The stop module 15 is identical for both rows. By having the two adjacent row indicators differ by only a single module reduces the ambiguity associated with trying to determine which row has been scanned. The ambiguity is resolved by comparing the decoded row indicator with the cluster number of the nearest decoded codeword.

For example: assume we are scanning the bar code with a laser scanner, row 1 always contains codewords belonging to cluster 0,
row 2 always contains codewords belonging to cluster 3, and
row 3 always contains codewords belonging to cluster 6.

Assume also that the laser beam, scanning across the rows, passes in between the left row 2 and the left row 1 indicators, and afterward passes across a decodable row 1 codeword located next to the left row 1 indicator. Having only one module difference in the row indicators' content causes the ambiguity in the codeword's placement to be limited to one of the two adjacent rows. This ambiguity is resolved by the fact that the codeword from cluster 0 could only be located in row 1. The fact that row 1 contains only cluster 0 codewords, and row 2 contains only cluster 3 codewords forces the decoder to resolve the row indicator ambiguity in favor of row 1.

This type of row error correction scheme improves tolerance to errors caused by the laser beam crossing multiple rows of bars and spaces. One can reduce the vertical to horizontal ratio of the individual module dimensions, thus increasing the probability of row cross-talk, and still be able to properly decode the row indicator and the codeword's location. Reduction of the vertical dimension of the modules in every row will reduce the vertical size of the label. PDF417 code requires correct identification of both, row indicators and codewords. This invention requires only correct identification of codewords, and accepts a distorted indication of row indicators. The error correction mechanism of the present invention can correct for this row indicator distortion.

Figure 2:
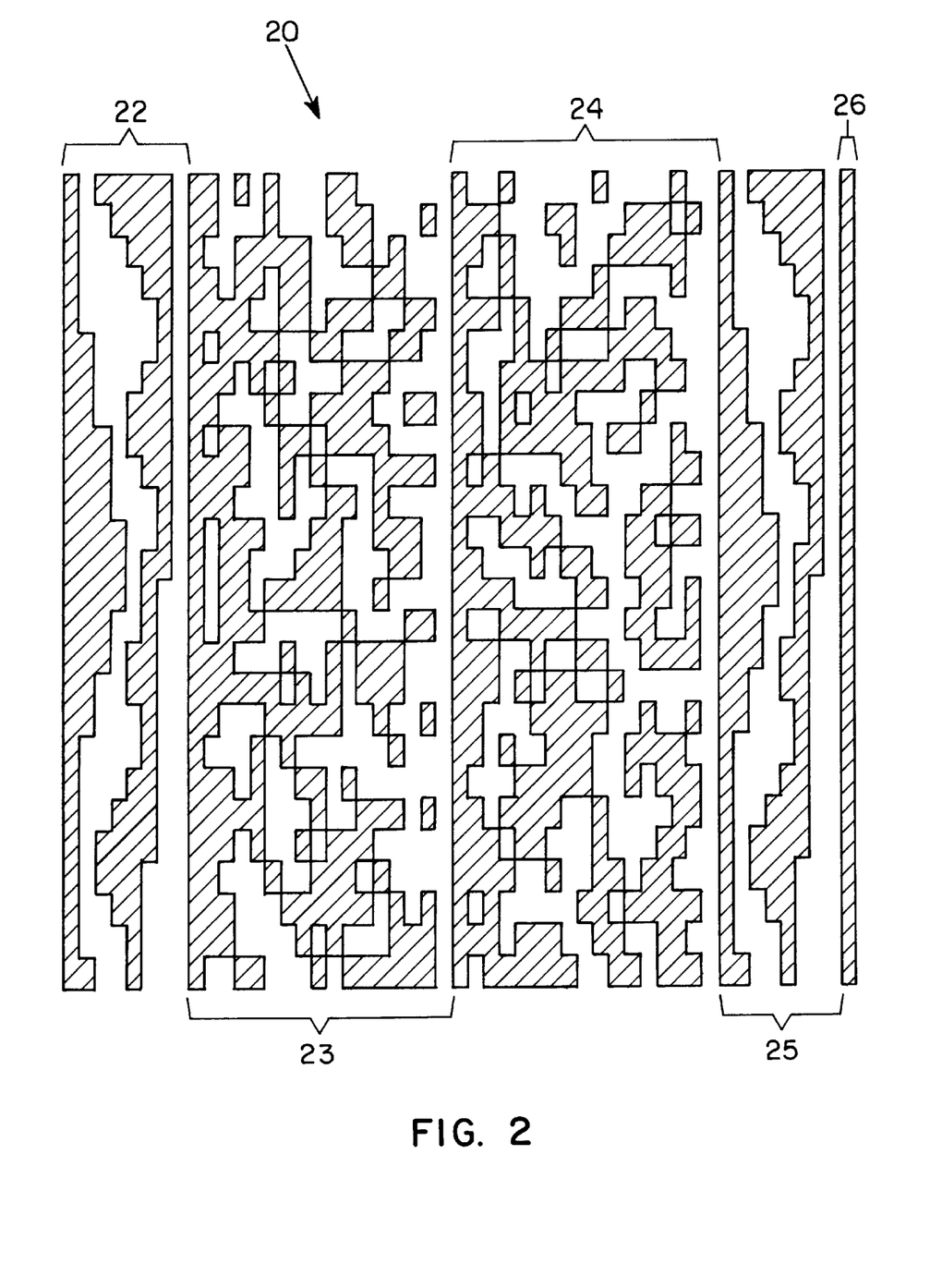
FIG. 2 is an illustration of a label in accordance with the present invention.

FIG. 2 shows a label 20, encoded in accordance with the present invention. The label depicts a column of left row indicators 22, two columns of PDF417 encoded codewords represented by reference numerals 23 and 24, a column of right row indicators 25, followed by a stop module 26. The vertical dimension of the label is controlled by the number of rows and the vertical height of each row. The label has been encoded with 26 rows of codewords. The vertical to horizontal module size ratio has been reduced from 3-to-1 for PDF417, to 2-to-1 for the present embodiment invention. Further reductions are also possible. It should be noted that the number of rows, and the row indicators, is limited by the number of workable permutations available through the use of the (8,2) gray code encoding scheme. A different maximum number of rows can be achieved by changing the n or the k values of the (n,k) gray code. Also, it is possible to generate a number if separate sets of row indicator sequences. In such case the adjacent row indicators belonging to the same set would differ by only one module, but the adjacent row indicators belonging to different sets may vary by more than one module. This would allow one to increase the number of rows in a label.

Because the actual data is still encoded using PDF417 code, the data security and data error correction associated with the PDF417 code are preserved.

Thus, using the present invention, one is able to encode large amounts of data into a two-dimensional bar code having good data security, good error correction and extremely small real estate requirements.

Following is a decode algorithm which can be used to decode a label printed according to the present invention.

1. Assume that a scan line consists of bar and space widths (i.e. DBP), and that the scan line is left-to-right
2. Select four consecutive bar-space pairs
3. Normalize the widths of the bars and spaces as described in the PDF417 specification
4. Determine if the resulting pattern represents a valid PDF417 codeword.
   a) If not, go to Step 6
   b) If so, continue to Step 4
5. Examine the 3 spaces and 2 bars that immediately precede the detected codeword (S0, B1, S1, B2, S2)
   a) If the first space (S0) is not at least 7 times the minimum module size as determined from the PDF codeword bar-space pattern found in Step 3 (p/17), a valid row indicator has not been found to the left of the codeword. Go to Step 5.
   b) Normalize the B1,S1,B2,S2 values to a total of 8 modules.
   c) Determine if the 2 bar-space pairs represent a valid row indicator pattern. If so, go to Step 7. If not, go to Step 5
6. Examine the 3 bars and 3 spaces that immediately follow the detected codeword (B1, S1, B2, S2, B3, S3)
   a) If the third bar (B3) is not equal to the minimum module size as determined from the PDF codeword bar-space pattern found in Step 3 (p/17), or if the third space (S3) is not at least 7 times the minimum module size, a valid row indicator has not been detected to the right of the codeword. Go to Step 6.
   b) Normalize the B1,S1,B2,S2 values to a total of 8 modules.
   c) Determine if the 2 bar-space pairs represent a valid row indicator pattern. If so, go to Step 7. If not, go to Step 5
7. Shift to the right by one bar-space pair (B1,S1 takes previous B2,S2 value, etc. B4,S4 take next bar-space pair in the line) and return to Step 2
8. Determine the cluster number C of the detected codeword (via PDF spec), and the row number R of the row indicator bar-space pattern (lookup table).
9. Compute the following value:
   M=(R−1)rem 3 (remainder when R−1 is divided by 3)
10. Modify the row number R as indicated by Table 1.
11. If the detected row indicator was to the left of the codeword:
    a) Place the codeword into the matrix at row R, column 1
    b) Select the four bar-space pairs immediately following the codeword
    c) Go to step 2
12. If the detected row indicator was to the right of the codeword:
    a) Place the codeword into the matrix at row R, column 2
    b) Discard any remaining data from this scan line, and begin processing the next scan line

TABLE 1

| | | 13. Row Number Modification Table | | | | | |
|---|---|---|---|---|---|---|---|
| 1. | | | 1. Codeword Cluster Number | | | | |
| 2. | M value | 2. | | 1. | | 1. | |
| 3. | | 3. | R | | a) | | a) |
| 4. | | | a) | 2. | R | | b) |
| 5. | | | b) | | a) | 2. | R |

It should be obvious to one skilled in the art that other decode algorithms are possible. For example, an algorithm that decodes the right to left scans can be constructed by following the logic presented above.

Figure 3:
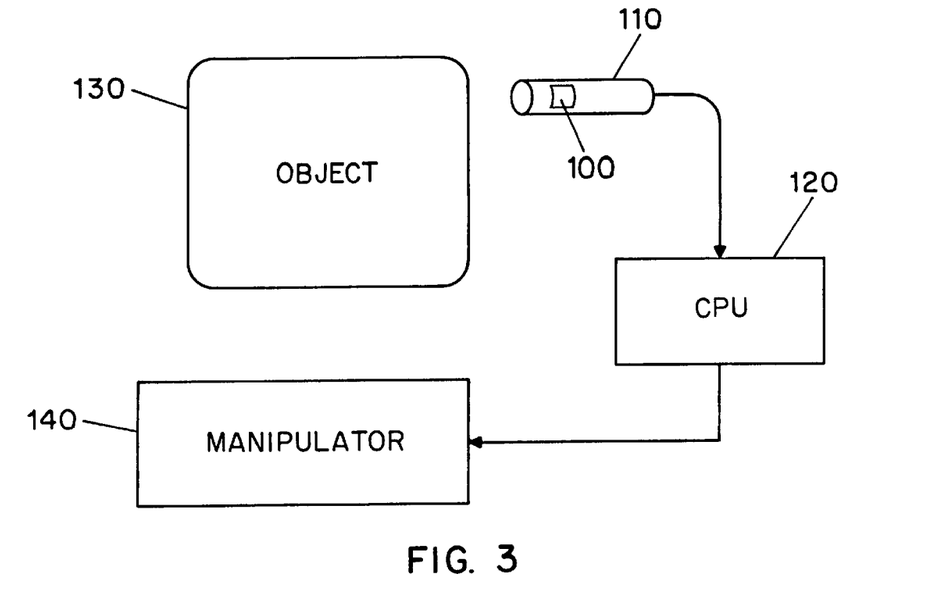
FIG. 3 is a block diagram of a computer system using the two-dimensional bar code symbol in accordance with the invention.

Referring to FIG. 3, a system may be build for using high density, two dimensional bar code symbols (FIG. 2 reference numeral 20) created by marking a suitable substrate(e.g. paper) with one or more labels in accordance with the foregoing description. The memory 100 may be combined with a fixed or a movable scanner 110 for use as a storage device for a suitably programmed computer such as a CPU 120.

For example, a robot might have an on-board computer programmed to control the robot to perform simple tasks, such a selectively moving the object 130 by means of manipulator 140. An on-board scanner 110 might operate as the robot's "eyes" for reading labels of the kind described above. In similar fashion, a conveyor system might include a fixed scanner 110 and a moving belt that served as the manipulator 140. The label preferably contains a list of instructions for operating the robot, with the computer on-board. The robot responding to data and instructions contained on the label.

Figure 4:
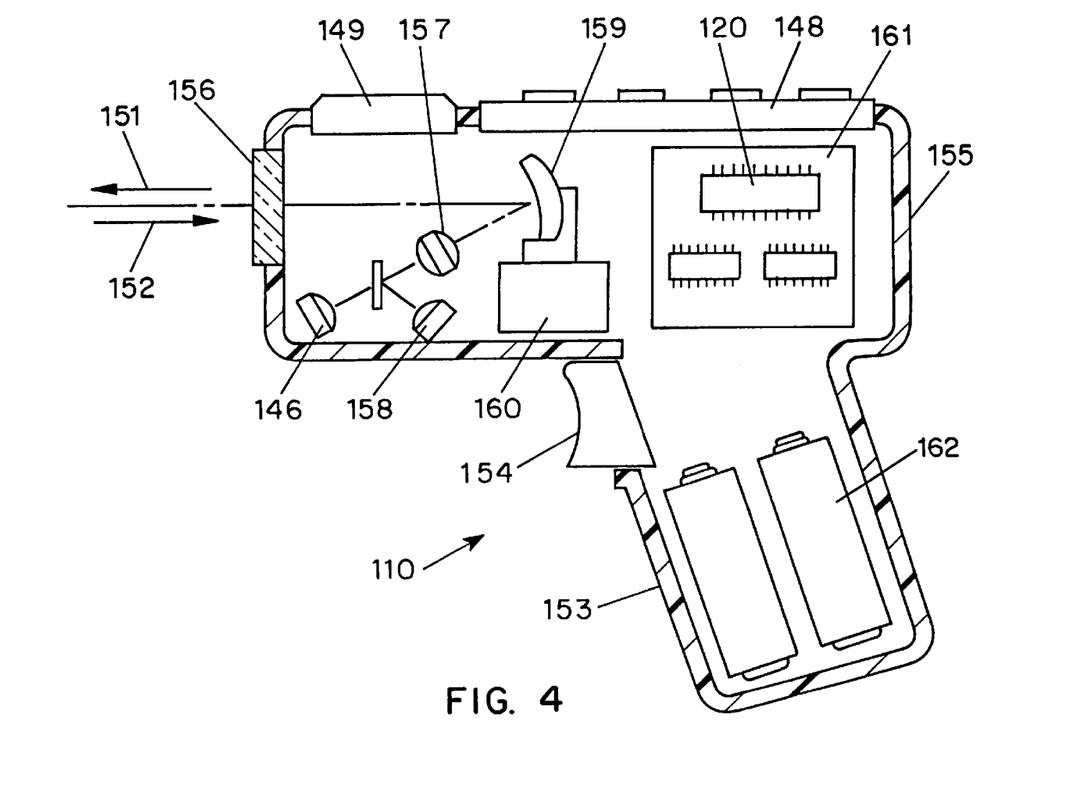
FIG. 4 shows a cross-sectional view of an implementation of a hand-held laser scanner which may be used to implement the present invention.
Figure 5A:
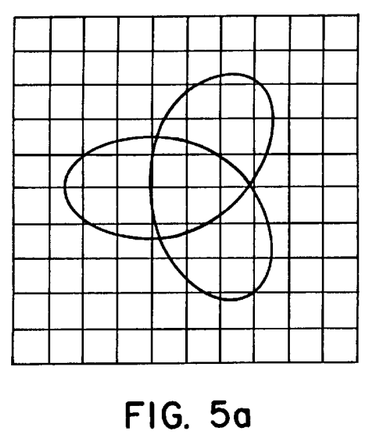
FIGS. 5a, 5b, 5c, 5d, and 5e depict various type of laser scanning patterns that may be used in connection with the present invention.
Figure 5B:
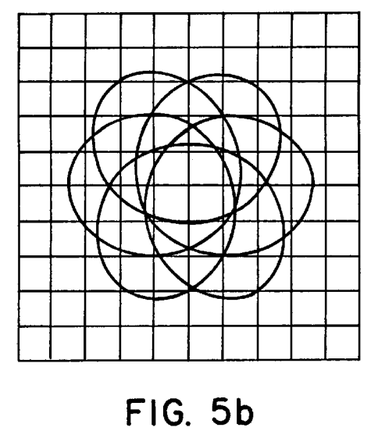
Figure 5C:
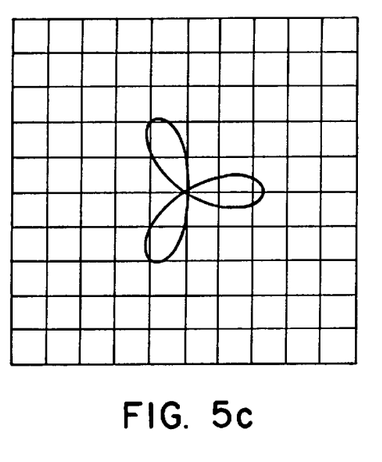
Figure 5D:
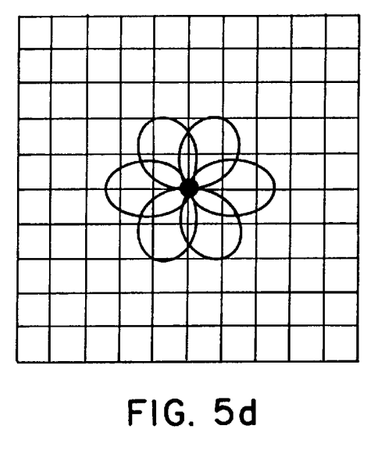
Figure 5E:
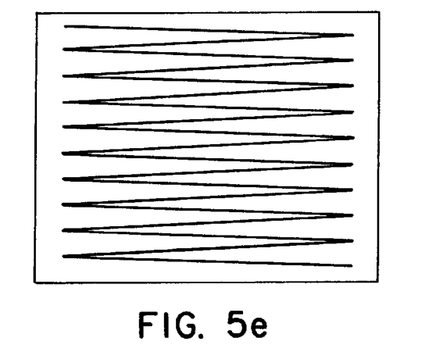

The present invention may be implemented in a hand-held, laser-scanning, bar code reader such as illustrated in FIG. 4. This hand-held device of FIG. 4 is generally of the type disclosed in U.S. Pat. No. 4,760,248 issued to Swartz et al., assigned to Symbol Technologies, Inc. Alternatively, or in addition, features of U.S. Pat. No. 4,387,297 issued to Swartz et al., or U.S. Pat. No. 4,409,470 issued to Shepard et al., both such patents assigned to Symbol Technologies, Inc., may be employed in constructing the bar code reader of FIG. 4. These U.S. Pat. Nos. 4,760,248, 4,387,297 and 4,409,470 are incorporated herein by reference. An outgoing light beam 151 is generated in the reader 110, usually by a laser diode or the like, and directed to impinge upon the bar code symbol generally located some distance away from the reader unit. The outgoing beam 151 is scanned in a fixed linear pattern, or a more complex pattern such as shown in FIG. 6 may be employed and the user positions the hand-held unit so this scan pattern traverses the symbol to be read. A central dark portion, such as in FIG. 6d, may be used for aiming. Other visual techniques may be associated for scan pattern to bar code alignment. Reflected light 152 from the symbol is detected by a light-responsive device 146 in the reader unit, producing serial electrical signals to be processed for identifying the bar code. The reader 110 is a gun shaped device, having a piston-grip type of handle 153 and movable trigger 154 employed to allow the user to activate the light beam 151 and detector circuitry when pointed at the symbol to be read, thereby saving battery life if the unit is self-powered. A light-weight plastic housing 155 contains a laser light source, the detector 146, the optics and signal processing circuitry, and the CPU 120, as well as the battery 162. A light-transmissive window 156 in the front end of the housing 155 allows the outgoing beam 151 to exit and the incoming reflected light 152 to enter. The CPU 120 is located on the circuit board 161. Multiple circuit board designs could also be used. The reader may have a display 149, as well as a manual entry control panel 148.

As seen in FIG. 4, a suitable lens 157 (or multiple lens system) is used to collimate and focus the scanning beam 151 onto the bar code symbol at an appropriate reference plane, and this same lens 157 may be used to focus the reflected light 152 onto a photodetector 146. A light source 158 such as a semiconductor laser diode is positioned to introduce a light beam into the axis of the lens 157 by a partially-silvered mirror and the other lenses or beam-shaping structure as needed, along with an oscillating mirror 159 which is attached to a scanning motor 160 activated when the trigger 154 is pulled. If the light produced by the source 158 is not visible, an aiming light may be included in the optical system, again employing a partially-silvered mirror to introduce the bean into the light path coaxially with the lens 157. The aiming light if needed, produces a visible-light spot which is scanned just like the laser beam; the user employs this visible light to aim the reader unit at the symbol before pulling the trigger 154.

FIGS. 5a–5e shows possible scan patterns which could be used in scanning the bar code. A bar code reader may use a particular pattern or alternate between the patterns. The preferred scan pattern is a raster pattern show in FIG. 5e.

The preferred embodiment of the invention has been describe above. It should be obvious to one skilled in the art that other embodiments of the present invention are possible without destroying the spirit of the invention.

For example, only one row indicator per row could be used. Although it is preferable to have at least one row indicator adjacent to each codeword, the number of columns of codewords located in between the two row indicators could be varied. One could encode the data content of the bar code using coding methods other then PDF417. One could change the n and/or the k values of both the row indicator and/or the data codeword. Non (n,k) gray code could be used for encoding the relative spacial positions of the corresponding codewords. Other cross-talk minimizing arrangement of codes, other than gray codes could be used for encoding the relative spacial positions of the corresponding codewords.

One could develop printing devices to encode such bar codes based upon optimization function that would select the appropriate bar code parameters for a particular application.

Other decode algorithms are possible based upon the specific bar code encodation scheme. Scan stitching algorithms can be used, where the codewords from different parts of same of the label are decoded, and recomposed into a decoded set of information, on repeated scans.

Bar code readers used to decode the bar codes printed according to the invention may contain wireless communication transceivers for communication with the host terminal.

I claim:

1. A two-dimensional machine readable label containing a set of encoded information, said label comprising:

(a) a first plurality of codewords corresponding to said set of encoded information; and (b) a second plurality of codewords corresponding to a spatial arrangement of the first plurality of codewords, each of said second plurality of codewords comprises a number of detectable mark/space modules organized in a predetermined mark/space pattern, whereby the second plurality of codewords is encoded using a gray-code encoding scheme, wherein a majority of adjacent ones codewords of said second plurality of codewords differ by a predetermined number of detectable mark/space modules.

2. The two-dimensional machine readable label according to claim 1, wherein the predetermined number of detectable mark/space modules is one.

3. The two-dimensional machine readable label according to claim 2, wherein the spacial arrangement of both of the pluralities of codewords is a row/column matrix arrangement and each of the codewords is encoded along a row orientation.

4. The two-dimensional machine readable label according to claim 3, wherein the row/column matrix arrangement contains at least one column of codewords of the second plurality of codewords.

5. The two-dimensional machine readable label according to claim 4, wherein each of the second plurality of codewords is a row indicating codeword.

6. The two-dimensional machine readable label according to claim 5, wherein the first plurality of codewords belongs to a set of codewords, said set of codewords includes at least three subsets of codewords, wherein each of said subsets of codewords contains a full information character set and no two adjacent rows of the row/column spacial arrangement contain codewords of the same subset.

7. The two-dimensional machine readable label according to claim 6, wherein there is a correlation between the codewords in any given row of the row/column spacial arrangement and the row indicating codeword located in said row.

8. The two-dimensional machine readable label according to claim 7, wherein the full information character set is PDF417 character set, and the at least three subsets of codewords are PDF417 subsets of codewords.

9. A two-dimensional machine readable label according to claim 8, wherein there is a correlation between the codewords in a row of the row/column arrangement and the row indicating codeword in said row.

10. A two-dimensional machine readable label containing a set of encoded information, said label comprising:
(a) a first plurality of codewords corresponding to said set of encoded information; and
(b) a second plurality of codewords corresponding to a spatial arrangement of the first plurality of codewords, each of said second plurality of codewords comprises of a number of detectable mark/space modules organized in a predetermined mark/space patterns, whereby the second plurality of codewords is encoded using a (N,K)gray-code encoding scheme, wherein a majority of adjacent codewords of said second plurality of codewords differ by a predetermined number of detectable mark/space modules.

11. The two-dimensional machine readable label according to claim 10, wherein the predetermined number of detectable mark/space modules is one.

12. The two-dimensional machine readable label according to claim 11, wherein
the spacial arrangement of both of the pluralities of codewords is a row/column matrix arrangement and each of the codewords is encoded along a row orientation.

13. The two-dimensional machine readable label according to claim 12, wherein
the row/column matrix arrangement contains at least one column of codewords of the second plurality of codewords.

14. The two-dimensional machine readable label according to claim 13, wherein
each of the second plurality of codewords is a row indicating codeword.

15. The two-dimensional machine readable label according to claim 14, wherein
the first plurality of codewords belongs to a set of codewords, said set of codewords includes at least three subsets of codewords, wherein each of said subsets of codewords contains a full information character set and no two adjacent rows of the row/column spacial arrangement contain codewords of the same subset.

16. The two-dimensional machine readable label according to claim 15, wherein
there is a correlation between the codewords in any given row of the row/column spacial arrangement and the row indicating codeword located in said row.

17. The two-dimensional machine readable label according to claim 16, wherein
the full information character set is PDF417 character set, and the at least three subsets of codewords are PDF417 subsets of codewords.

18. A method of encoding a set of information into a two-dimensional machine readable label having a plurality of codewords comprising the steps of:
(a) encoding said set of information into a first plurality of codewords using (N,K) encoding scheme;
(b) arranging said first plurality of codewords into a row/column matrix arrangement;
(c) encoding a predetermined sequence information corresponding to codewords of the first plurality of codewords in a particular row using (N,K) gray-code encoding scheme into a row indicating codewords, said row indicating codewords comprising a second plurality of codewords;
(d) appending the row indicating codewords to the row/column matrix arrangement to form a plurality of codewords;
wherein a majority of adjacent codewords of said second plurality of codewords differ by a predetermined number of detectable mark/space modules.

19. The method according to claim 18, wherein the first plurality of codewords belongs to a set of codewords, said set of codewords comprises an at least three subsets of codewords.

20. The method according to claim 19, wherein each of the at least three subsets of codewords contains full information character set and no two adjacent rows of codewords in the row/column matrix arrangement of the first plurality of codewords contain codewords of the same subset.

21. The method according to claim 20, wherein there is a correlation between the row indicating codeword located in a row and other codewords in the row.

22. A device for generating a signal representative of a set of information encoded in a two-dimensional machine-readable label, said label having a first plurality of codewords corresponding to said set of encoded information, each of said first plurality of codewords representing at least one information bearing character, said label having a second plurality of codewords encoded in a predetermined sequence using an (N,K) encoding scheme, said first and said second pluralities of codewords arranged in a predetermined spatial arrangement, said codewords of the second plurality of codewords corresponding to said codewords of the first plurality of codewords, said device comprising:

(a) scanning means for scanning said codewords within the machine readable label;

(b) means for decoding each of the pluralities of scanned codewords;

(c) means for correlating the decoded codewords within each of the pluralities of codewords and between the codewords of the said two pluralities based upon the predetermined sequence and the predetermined spatial arrangement;

(d) means for computing an encoded information of the scanned codewords based upon an output of the correlating means.

* * * * *